June 25, 1929.　　　H. E. HOOVER　　　1,718,293
BEARING AIR PROTECTION
Filed Oct. 6, 1923

Inventor
Howard Earl Hoover
By  H. S. Demaree
Attorney

Patented June 25, 1929.

1,718,293

UNITED STATES PATENT OFFICE.

HOWARD EARL HOOVER, OF GLENCOE, ILLINOIS, ASSIGNOR TO THE HOOVER COMPANY, OF NORTH CANTON, OHIO, A CORPORATION OF OHIO.

BEARING AIR PROTECTION.

Application filed October 6, 1923. Serial No. 667,067.

My invention relates to means of protecting a bearing and associated members from fouling due to dust and dirt or grit.

In many machines such as suction sweepers, grinders, buffers and similar mechanisms, it has been heretofore common for the bearings to foul rapidly due to dirt and grit gathering thereon and thereabout.

The object of this invention is to prevent this fouling of the bearings and produce a structure wherein there is means immediately associated with a rotary member for creating a directed current of air or other fluid around or about the bearing which will carry away from the bearing any dirt or foreign matter tending to collect.

For the purpose of illustrating my invention, I have here shown several forms in which my invention may be embodied, though, of course, it will be understood that the invention as set forth in the appended claims is not limited to the precise forms as shown nor to its use with any particular structure but may accordingly be modified to suit conditions as found.

Figure 1:
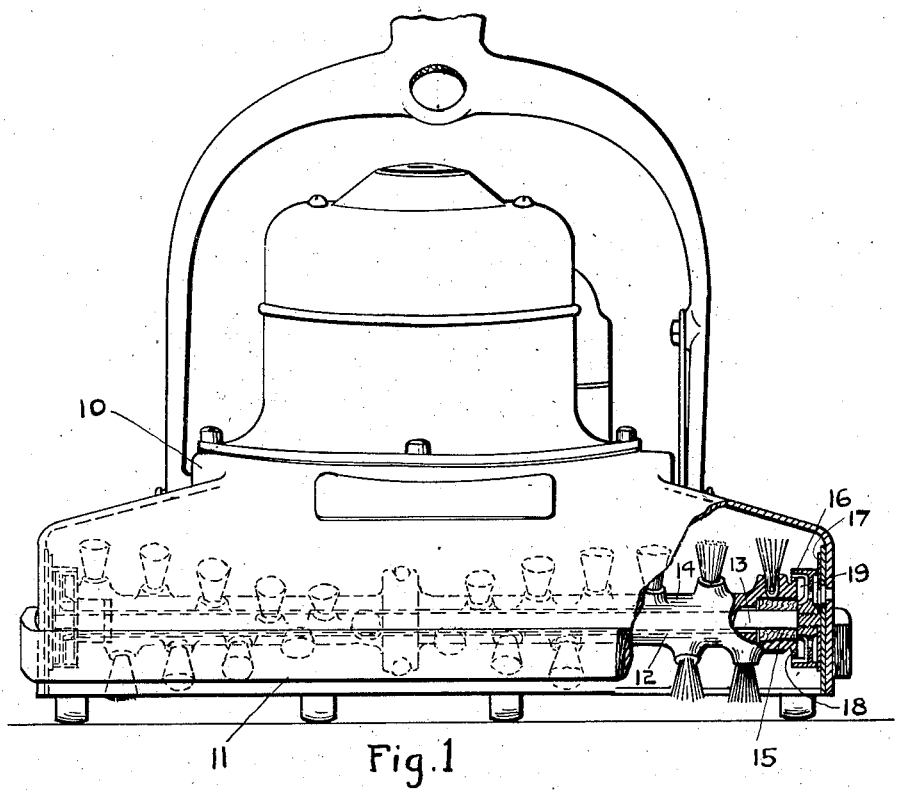
Fig. 1 is a front elevation of a suction sweeper having parts thereof broken away, the application of my invention being shown in section.

In the specific application of this invention as disclosed in Fig. 1, a suction sweeper indicated in its entirety by the numeral 10 is provided with a brush assemblage 12 comprising fixed shaft 13, brush roll 14, bearing 15, and thread guard 16, which is screw threadedly secured to the shaft 13, the shaft 13 being in turn mounted in plates 17 secured to the end walls of the suction nozzle 11. Brush roll 14 is provided at the end with a flange portion, such as 18 and on this end are provided fan blades such as 19. Specific operation of the structure described will not be given since the operation of this application of my invention is similar to that shown in other views and which will be described more fully.

Figure 2:
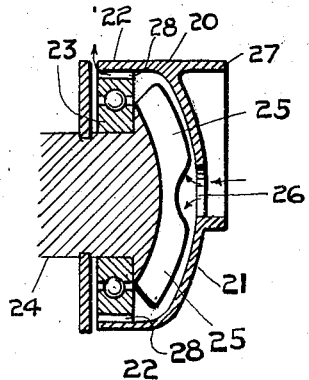
Figs. 2, 3 and 4 show modified forms in which my invention may be applied.

In Fig. 2 is shown a structure where air protection is provided for a ball bearing mounting for the purpose of preventing dust and dirt from fouling the bearing. This construction comprises a stationary member indicated as a whole at 20 which comprises substantially a centrally dished portion 21, the outer rim 22 of which is substantially straight and at right angles to the general plane of portion 21.

Ball bearing 23 is supported by the portion 22 of member 20 and journalled in this bearing is a rotating member 24. The end of the member 24 is provided with curved fan blades, such as 25 which form in effect a small centrifugal fan. Substantially central of member 20 is provided an opening 26 for the purpose of admitting air to the center of the fan formed by fan blades 25. A circular flange portion 27 is formed on member 20 and forms a convenient means whereby the entire structure may be mounted and also provides means by which the entire unit can be adjusted, since the flange 27 is eccentric to member 20.

The operation of this arrangement is such that as shaft 24 rotates, the fan blades 25 being formed thereon or secured thereto, likewise rotate and as is common with a fan of this type, air will be propelled from the center thereof toward the ends, thus drawing a current of air through opening 26 at the center of the fan and discharging this air from the outer ends of the fan blades 25. The rim portion 22 in which bearing 23 is mounted prevents free escape of this current of air and the only escape being through the notches 28 formed in the outer ring of the ball bearing, air will be forced therethrough and create an air stream away from the bearing which will prevent dust or dirt travelling towards the bearing from getting into it, since this air stream will pick up dust and dirt and carry it from the immediate vicinity of the bearing.

Figure 3:
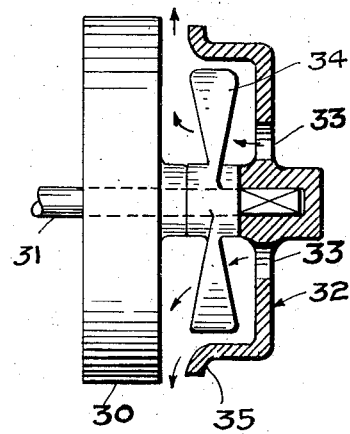

In Fig. 3 is shown a still further application of my invention wherein there is a rotating member indicated at 30, supported on a shaft 31, which shaft has a bearing surface on its end mounted in support member 32. This support member is provided near the central bearing with small openings such as 33 for the admission of air, and there is provided between member 30 and support 32 a small bladed fan indicated at 34, which is secured to shaft 31 so that it rotates with member 30. Support member 32 is provided with a flange, such as 35 so that only a relatively small space is left between said flange and the member 30 in order that an air current, which will be set up on rotation of fan member 34, will be drawn in through openings 33 and will be expelled between member 30 and flange 35 in a narrow stream, which will prevent dust and dirt from entering at this point and will thus protect the bearing from fouling.

Figure 4:
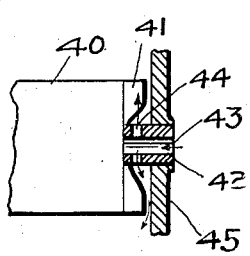

In Fig. 4 is shown still another application of my invention, in which a rotating member 40 is provided on the end thereof with small fan blades 41 and a central bearing member 42. The bearing member is provided with a longitudinal opening 43 and radial openings 44, and is mounted for rotation in a stationary member such as 45. Rotation of member 40 will cause air to be drawn in through openings 43 and 44 and expelled from the ends of the blades 41 along the mounting member 45 in a direction away from the bearing surfaces, thus preventing dirt and dust from travelling to the bearing surface.

The purpose and use of my invention resides largely in those cases in which a rotating member rotates in a chamber within which there is considerable dirt or dust which would tend to foul the bearing surfaces of the rotating member, but by placing a small fan on the end of the rotating member and providing means whereby clean air may be admitted centrally to the fan, means is provided whereby an air current is directed through a restricted portion of the structure between the rotating part and the part in which it is mounted, which air current being directed away from the bearing will prevent dirt from entering therein and fouling it.

It is to be understood that the applications of this invention as shown in the drawings are illustrative only, and that many other forms of application thereof are possible, depending largely upon the particular mechanical structure wherein the invention is employed, my invention being broadly the idea of providing air propelling means formed directly on the rotating part or attached thereto.

It can readily be seen that I have herein illustrated and described very simple means for the protection of bearings from fouling because of conditions of use wherein there is a large amount of dirt and dust which would ordinarily find its way into the bearings and foul them, or if composed of grit, would cut the bearing surfaces and thereby destroy the bearing.

I claim:—

1. A rotatable member, a bearing in which said member is journalled, means having apertures therethrough mounted adjacent said bearing, spaced longitudinally therefrom, and approaching said member closely peripherally, in combination with means mounted for rotation between the end of the rotatable member and said first mentioned means, said last mentioned means constituting means for causing a flow of air in through the apertures in said first mentioned means and out through the space between said member and said first means.

2. In a foul air conduit, a rotatable member, a bearing in which said member is mounted, the end of said rotatable member being spaced from the wall of the conduit, means for creating a current of air positioned between the wall and the end of the rotatable member, a wall of the conduit having apertures admitting air from the exterior of said conduit to said air current creating means, the air current creating means discharging a current of air between the wall of the conduit and the end of the rotatable member.

Signed at Chicago, in the county of Cook and State of Illinois, this 2nd day of October A. D. 1923.

HOWARD EARL HOOVER.